Figure 1:
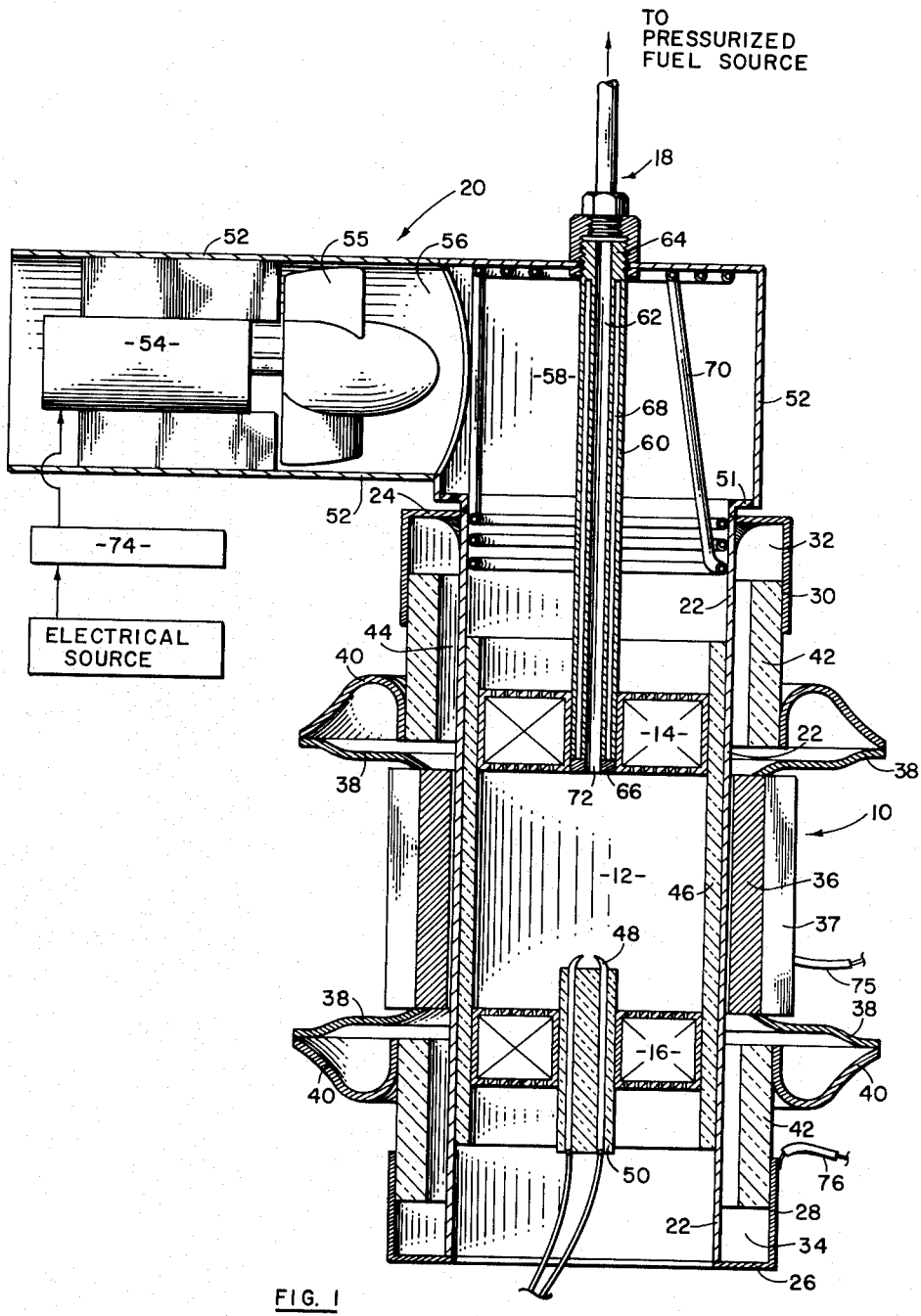

INVENTOR.
WILLIAM R. MARTINI

United States Patent Office 3,223,858
Patented Dec. 14, 1965

3,223,858
REGENERATIVE THERMIONIC CONVERTER
William R. Martini, Northridge, Calif., assignor to North American Aviation, Inc.
Filed Nov. 30, 1962, Ser. No. 241,328
4 Claims. (Cl. 310—4)

The present invention is directed to devices for the conversion of heat to electricity and more particularly to thermionic diode energy converter heaters.

In the direct conversion of thermal energy of combustion gases to electricity through the use of thermionic diode converters the loss of heat through expelled combustion gases at high temperatures represents inefficient fuel usage and a degradation of diode performance because of lowered cathode temperature. These losses have been partially reduced through preheating of fuel and air before ignition. However, such preheating often results in the premature ignition of the fuel-air mixture, coking of the fuel injection line, or the requirement for extensive air-preheat thermostat control apparatus. Thus, prior attempts to reduce heat losses have generally resulted in complicated arrangements introducing significant operating problems.

It is the primary object of the present invention to reduce the heat losses in the direct conversion of heat to electricity without introducing complicated structural arrangements or controls.

It is a further object of the present invention to provide an improved regenerative heater for a cathode of a thermionic diode.

It is another object of the present invention to provide a thermionic diode heater arrangement having increased cathode area in contact with the heat source utilizing high pressure fuel injection.

It is a still further object of the present invention to provide a thermionic diode heater which utilizes regenerative heat exchangers, pressurized liquid-cooled fuel injection, and placement of the heat exchangers and combustion chambers internal to the thermionic diode.

These and other objects of the present invention together with the novel features, details of construction and arrangement of parts embodied in the invention are hereinafter set forth in the specification and claims and illustrated in the accompanying drawing, which is made a part of the specification, wherein the sole figure is a sectional view of the thermionic diode and associated heating system.

Referring now to the drawing in detail, the preferred embodiment of the present invention comprises a thermionic diode indicated generally at 10, a combustion chamber 12 centrally located within diode 10, a pair of regenerative heat exchangers 14 and 16, a fuel injector 18, and air flow reversing means 20. The diode consists of a cylindrical molybdenum cathode sleeve 22, a top and bottom closure plate 24 and 26 respectively, and outer seal cylinders 28 and 30. The plates 24 and 26 are brazed to the respective ends of the cathode 22 and to the ends of cylinders 28 and 30 so that upper and lower annular chambers 32 and 34 are formed. The cylindrical anode 36 is disposed in closely spaced relation with the outer surface and at the approximate mid-point of the cathode 22. Cooling fins 37 are provided on the outer surface of anode 36 to promote radiation cooling. Anode 36 is supported by and sealed to flexible diaphragm members 38 of very thin sheet material which are in turn sealed to the outer periphery of metallic circular support elements 40. Electrically insulating cylindrical seals 42, preferably of aluminum oxide, are sealed to the inner ends of cylinders 28 and 30 and inner surface of support elements 40 and are spaced from the cathode 22. In this manner, the anode 36 is electrically insulated from cathode 22 and is flexibly supported adjacent thereto to provide for thermal expansion of the cathode without affecting the cathode-anode spacing. Further the chamber 32, remotely located with respect to the combustion chamber 12, is utilized as a cesium reservoir. The chamber 32 communicates through the passage 44 defined by the cathode 22 and spaced seal 42 with the inter-electrode space between the outer surface of cathode 22 and the inner surface of anode 36 so that cesium vapor is present in the inter-electrode space.

A heat shield sleeve 46, preferably of silicon carbide, extends over the major portion of the inner surface of cathode 22 and separates the cathode 22 from the combustion chamber 12. The upper and lower boundaries of the combustion chamber 12 are defined by regenerative heat exchangers 14 and 16 supported by the sleeve 46 and may consist of a packing of wire screen stacks, corrugated metal, or refractory material having numerous apertures for the passage of air. Extending through and supported by regenerator 16 are electrical ignition electrodes 48 insulated from each other by insulator support 50. While electrical ignition of the fuel-air mixture in the combustion chamber is preferred, other means well known in the art may be utilized.

On the upper end of the cathode 22 and plate 24, an electrical insulator 51 supports an air duct 52 in which is mounted a motor 54 operatively connected to a fan 55. The duct 52 communicates through regenerator 14 to combustion chamber 12 and regenerator 16. A diffusor 56 is preferably located between the fan 55 and the main chamber 58 of the duct 52. The fuel injector 18 is supported on the upper surface of duct 52 and includes an outer tube 60 and a small diameter inner tube 62 which is sealed to the outer pipe 60 at both ends by inserts 64 and 66 so that a sealed chamber 68 is formed. The chamber 68 is filled with a coolant to maintain the fuel passing through tube 62 below the coking temperature.

A separate heat exchanger shown generally as tube 70 is utilized for removing heat from the plasma, i.e., cesium, reservoir volume or source in chamber 32. The tube 70 is in contact with the chamber 32, but is preferably electrically insulated (not shown) from duct 52 so that the cathode 22 is not grounded. The function and operation of this tube and the fluids utilized is more fully explained in the inventor's copending application S.N. 241,274, filed November 30, 1962, entitled, "Method and Apparatus for Controlling Temperature."

In operation, the heater of the present invention is started by forcing air through duct chamber 58 down through top regenerator 14 into the combustion chamber 12 by energizing the motor driven fan 55. Fuel is forced through tube 62 into the combustion chamber 12 through fuel orifice 72. The fuel and air mix in the combustion chamber 12 and are ignited by a suitable spark from electrodes 48. Ignition may also be accomplished by preceding the regular fuel by a suitable self-igniting fuel, or the top or bottom regenerator may be removed so that combustion may be started in the combustion chamber 12 with a match. Once the burning begins the bottom regenerator 16 heats up due to the hot exhaust gases passing through it and in this manner materially reduces the temperature of the exhaust gases and stores the heat in the regenerator 16. The regenerators 14 and 16 are made with very large surface-to-volume ratios and consequently with narrow flow passages. After this burning and air flow process has proceeded for a predetermined length of time, e.g., 30 seconds, the fan 55 is automatically reversed by time switch 74. The time interval is selected so that the bottom of the regenerator 16 does not become too hot before flow reversal. Upon air flow reversal, the fuel injection is continued without interruption but, since the air is now being passed through the hot regenerator 16 prior to entry into the combustion chamber 12, it is preheated thereby materially improving the combustion process. During this portion of the operating cycle, the exhaust gases are passing upwardly through a regenerator 14 thereby heating it so that the temperature of the exhaust gases is reduced and heat stored. This portion of the flow cycle is maintained for a predetermined length of time, e.g. 30 seconds, and is again reversed. The periodic reversal is continued throughout operation thereby reducing heat losses and improving the combustion process. The heat cycle to which the tubes 70 and 60 are exposed by the alternate exposure to cool incoming air and hot exhaust gases maintains the cesium reservoir and coolant in chamber 68 between prescribed temperature limitations.

By proper selection of volume to surface area, the fluid in chamber 68 will be maintained at a temperature sufficiently high to preheat the incoming fuel but low enough to prevent fuel coking.

Heat from the combustion chamber 12 passes out through the shield 46 and cathode 22 to cause electrons to be boiled off the cathode and pass to the anode 36. Appropriate electrical connections from leads 75 and 76 are made to an external load or control circuit, not shown, from the cathode 22 and anode 36.

While the preferred embodiment of the present invention has been described, it is clear that many modifications may be made without departing from the scope of the invention. For example, the fan could through appropriate ducts be alternately connected to opposite ends of the diode for reversing the flow of air, other ignition means, cesium reservoir cooling means, and cathode-to-anode support means could be utilized without departing from the scope of the invention. Therefore, the present invention is not limited by the foregoing description but solely by the appended claims.

What is claimed is:

1. An internally heated fuel-fired thermionic converter device comprising, in combination:
    a thermionic diode including in cooperatve relation a cylindrical cathode, an anode circumferentially spaced from said cathode, and plasma contained in the interelectrode space between said cathode and anode;
    an interior combustion chamber whose sides are defined by said cathode;
    regenerative heat exchangers disposed within said combustion chamber and defining the ends thereof;
    fuel-injecting means and air injecting means for separately and controllably injecting fuel and air into said chamber so that mixing of said fuel and air occurs only within said chamber to form a combustible mixture;
    means for igniting said combustible mixture within said chamber to generate heat whereby said cathode is heated to an operative electron-emitting temperature;
    and means for controlling the flow of air into said chamber in a preselected reversible direction so that each of said regenerative heat exchangers serves alternately to preheat the air entering said combustion chamber and to cool the exhaust gases ejected from said chamber whereby heat losses from said chamber are minimized.

2. The converter device of claim 1 including duct means connected to one end of said cathode and communicating with said chamber, reversible fan means in said duct means for controlling the flow of air into said chamber, and means for periodically reversing said fan means.

3. The device of claim 1 wherein said fuel injecting means includes means for maintaining said fuel below its coking temperature.

4. The device of claim 1 including means in contact with the inner surface of said cathode to prevent direct contact between said cathode and the combustion gases in the combustion chamber.

References Cited by the Examiner
UNITED STATES PATENTS

| | | | |
|---|---|---|---|
| 2,718,534 | 9/1955 | Harris | 158—99 |
| 2,851,340 | 9/1958 | Coberly | 158—99 |
| 2,980,819 | 4/1961 | Feaster | 310—4 |
| 3,021,472 | 2/1962 | Hernqvist | 310—4 |
| 3,119,059 | 1/1964 | Hall | 310—4 |

FOREIGN PATENTS 1,242,179  12/1959  France.

MILTON O. HIRSHFIELD, *Primary Examiner.*